Dec. 19, 1944.  A. H. LLOYD  2,365,571
ACTUATION OF CHANGE-SPEED GEARING, PARTICULARLY FOR MACHINE TOOLS
Filed July 13, 1942  3 Sheets-Sheet 1

Inventor
Arthur H. Lloyd
by Mawhinney & Mawhinney
Attorneys.

Dec. 19, 1944.   A. H. LLOYD   2,365,571
ACTUATION OF CHANGE-SPEED GEARING, PARTICULARLY FOR MACHINE TOOLS
Filed July 13, 1942   3 Sheets-Sheet 2

Inventor
Arthur H. Lloyd
by Mawhinney & Mawhinney
Attorneys.

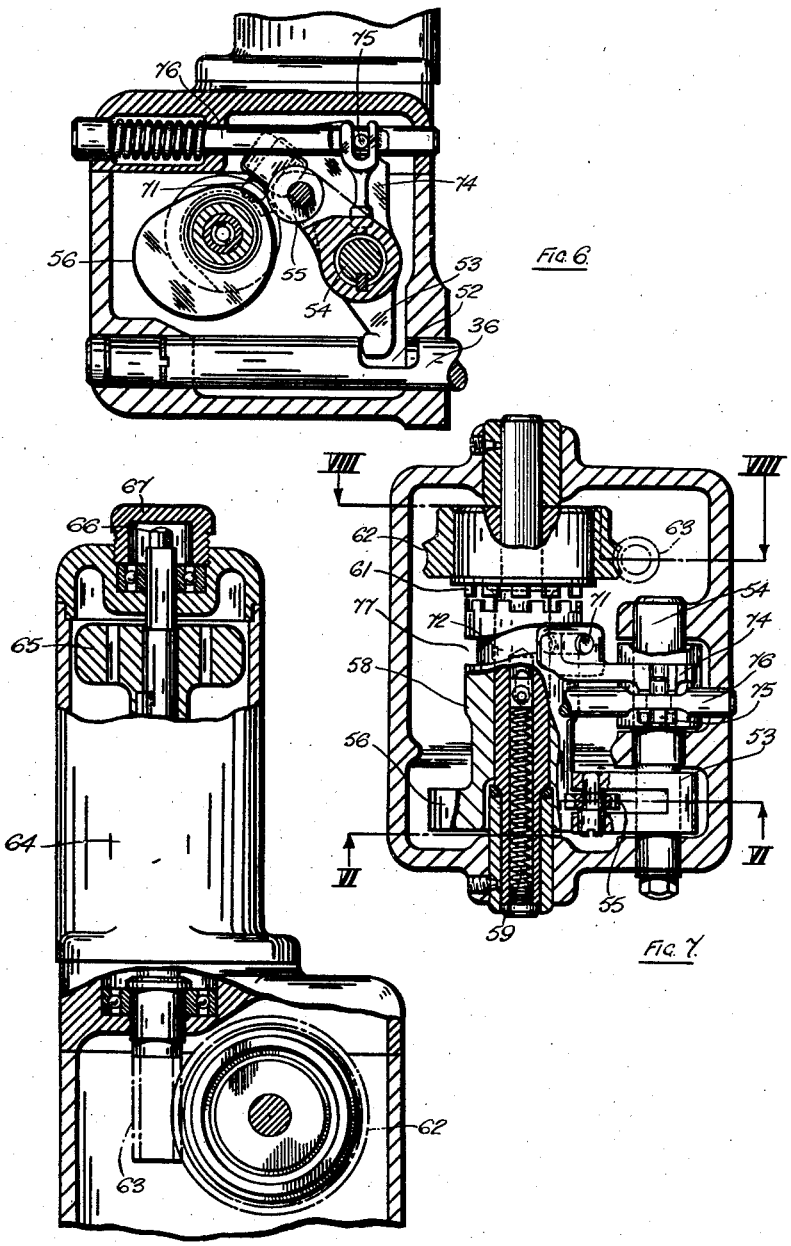

Patented Dec. 19, 1944

2,365,571

UNITED STATES PATENT OFFICE 2,365,571

ACTUATION OF CHANGE-SPEED GEARING, PARTICULARLY FOR MACHINE TOOLS

Arthur Harold Lloyd, Coventry, England, assignor to Alfred Herbert Limited, Coventry, England Application July 13, 1942, Serial No. 450,718
In Great Britain November 12, 1941

8 Claims. (Cl. 74—335)

This invention relates to a pre-selective change-speed gearing, particularly for a machine-tool, in which actuation is effected by movement of a rod.

Although not limited in this respect the invention is particularly applicable to the type of preselective change-speed gearing which includes a pair of profile members which are rotatable in unison for setting purposes and movable axially towards one another—for example, against a retracting spring—for introducing the selected speed. British patent specification No. 434,893, in the name of Alfred Herbert Limited and others, describes actuating means, for such a pre-selective change-speed gearing for a machine-tool, which is power-operated from an appropriate part of the machine-tool.

My main object is to provide alternative means for the power-operation of a pre-selective change-speed gearing which will have advantages in certain conditions over the means of the specification aforesaid. For example, the present device may be fitted to a headstock incorporating a manually-actuated preselective gearing whereby the latter can be power-actuated.

According to one feature of the invention, use is made of a low-power electric motor fitted with a relatively-heavy fly-wheel and connected through a reduction gear—for example, a worm gearing giving a reduction of about 30 to 1—to rotate continuously one part of a clutch, which is preferably a dog clutch, the other part of the clutch (when the clutch is engaged) serving to operatively move the actuating rod for the change-speed gearing during a partial rotation of the driven clutch part. Preferably the motor used is about one-sixth or one-eighth H. P. and one adapted to be operated at about 3000 R. P. M. Conveniently it is an induction motor which can stall if the parts should jam (for example, if the actuating rod were moved at a time when the setting operation had not been completed), and by providing it with a non-circular shaft-end which is accessible the motor can be manually reversed in such cases to free the parts.

The invention further consists, for actuating a change-speed gearing particularly for a machine-tool, in a slidable rod by the movement of which in one direction actuation is effected, the rod being connected to an operating lever coacting with a cam on a slidable clutch part which is spring-pressed in the direction to engage a continuously-rotating clutch part and is normally held out of engagement therewith by a control. In a preferred arrangement the clutch is normally held out by a spring-engaged control which can be temporarily released by a cam drum or other part of the machine-tool, the said control coacting with a cam surface on the slidable clutch part in a manner known per se to retract it from engagement after one revolution.

In the accompanying sheets of drawings, illustrating one arrangement according to the invention—

Figure 6 is a part-sectional vertical elevation showing mainly the electric motor and the reduction gearing, the section being taken on the lines VI—VI of Figure 7, by which the cam device can be actuated;

Figure 7 is a horizontal section taken mainly through the clutch of the actuating mechanism but slowing some of the parts above the clutch; and Figure 8 is a vertical section taken mainly on the lines VIII—VIII of Figure 7.

Figures 1, 2:
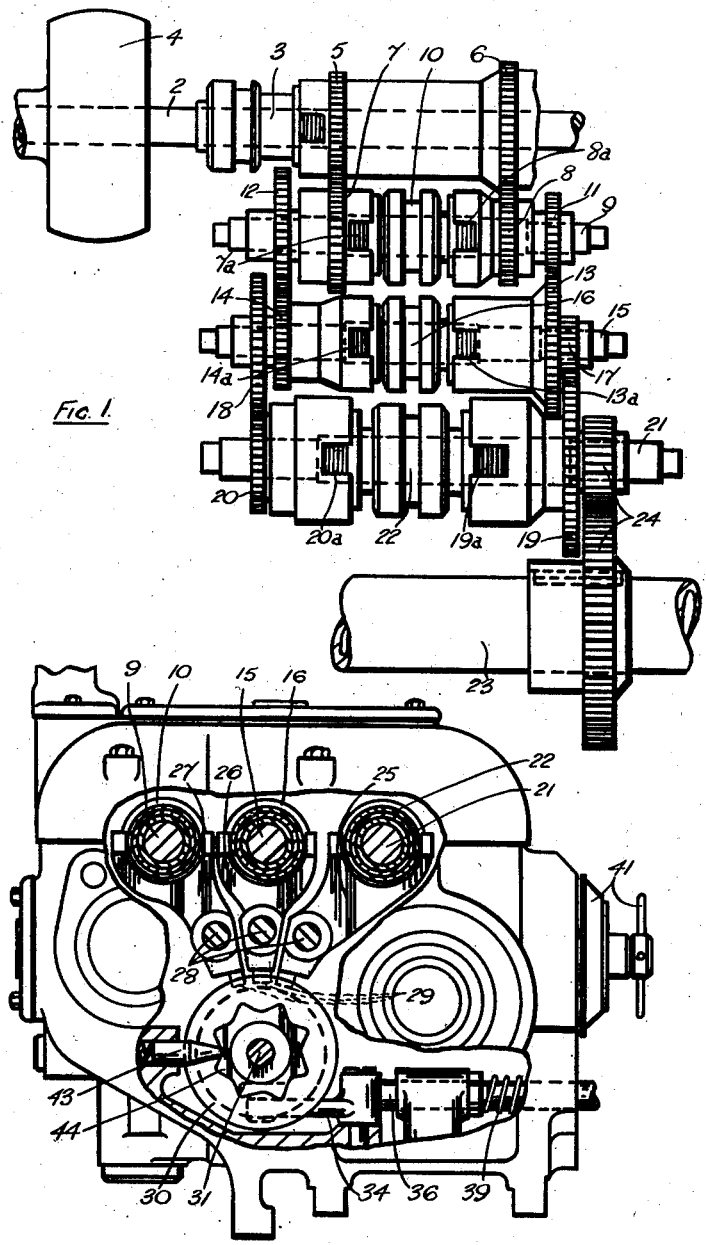
Figure 1 is a diagrammatic lay-out of the gearing of the change-speed mechanism.
Figure 2 is a part-sectional end elevation of a headstock fitted with this gearing (looking from the left of Figure 1) and showing the profile members and the grouped clutch-operating striking forks for the gearing, the gearing itself not being shown.

In the construction illustrated by Figures 1 to 5, as applied to gearing for driving the spindle of a lathe-headstock and adapted to give eight different speeds, the drive is taken from a shaft 2 which may conveniently carry or be connected with a stopping and starting clutch 3 and a brake (not shown), and which may be driven by an electric motor, pulley 4 or otherwise. This shaft is shown as carrying a rotatable sleeve which can be clutched thereto by the clutch 3 and has two different gears 5, 6 fast thereon and in mesh, respectively, with gears 7, 8 which are free on a parallel lay-shaft 9. Between the gears on the lay-shaft is a double-ended clutch control member 10 adapted at its extreme positions to cause the respective gears to be clutched to the lay-shaft through appropriate friction clutches 7a and 8a. By this means two speeds can be obtained on the lay-shaft 9.

Fast on the lay-shaft 9 are two different gears 11, 12, arranged outside the clutch and the free gears 7, 8, which are constantly in mesh with gears 13, 14 free on a second parallel lay-shaft 15, these latter also being provided with friction clutches 13a, 14a which can be selectively engaged by means of a double-ended sliding clutch control member 16 in its extreme positions. Thus, four different speeds can be obtained on the second lay-shaft. Fast on the lay-shaft 15 are two different gears 17, 18, arranged outside the clutch and the free gears 13, 14, which are constantly in mesh with gears 19, 20 free on a third parallel lay-shaft 21, the latter also being provided with friction clutches 19a, 20a which can be selectively engaged by means of a double-ended sliding clutch control member 22 in its extreme positions. Thus, eight different speeds can be obtained on the third lay-shaft 21, from which the drive is taken to the lathe spindle 23 through a further gear pair 24.

For sliding these clutch control members to their extreme positions, use is made of striking forks 25, 26, 27 fast on slidable spindles 28, 28 parallel to the lay-shafts, the forks being arranged so that stems 29, 29 thereon are grouped adjacent one another and enter radially into the space between two profile discs 30, 30 axially movable but splined upon a rotatable shaft 31. The adjacent surfaces 32, 32 of the discs 30 are correspondingly but oppositely recessed to receive the stems 29 to one side or another of the striker fork centre positions, the recesses being arranged in eight groups spaced around the discs 30, and each group corresponds to one speed. This is most clearly illustrated in the diagram of Figure 5, where the eight groups are marked A, B, C, D, E, F, G and H.

Thus, when one group is in operative position relative to the grouped striker fork stems 29, and the discs 30 are actuated axially towards one another, the stems 29 are actuated to push the clutch members all to the right, or all to the left, or one to one side and the other two to the other, dependent upon the group of recesses selected, so that the particular speed corresponding to that group will be obtained. Thus, in Figure 3, it is the group G that is in this position.

Figure 3:
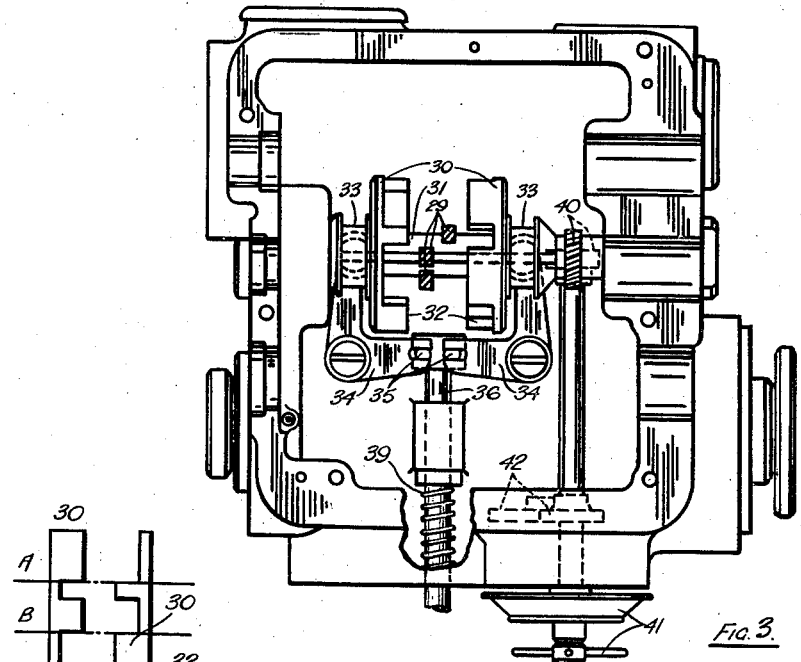
Figure 3 is a plan of the profile members, showing the operating means therefor.
Figure 5:
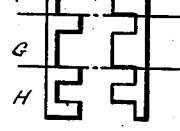
Figure 5 is a developed plan of the profile members.
Figure 4:
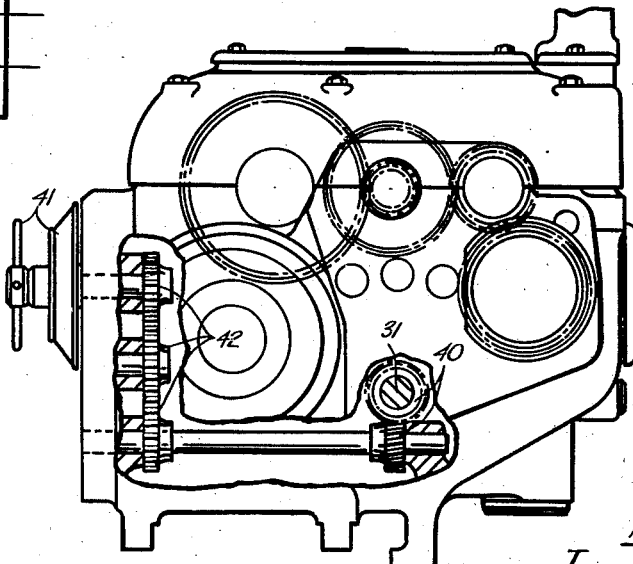
Figure 4 is a part-sectional end elevation of the headstock (looking from the right of Figure 1), showing mainly a further view of the operating means for the cam device.

For actuating the discs 30, each may be formed on its outside radial face with a grooved hub 33 engaged by the end of a bell-crank lever 34, the other arms of which are directed towards one another and freely linked at 35 to a sliding rod 36 which is in the plane of the bell-cranks. Preferably, a spring 39 is applied to the rod 36 to bias the discs 30 from one another. In this case, when the rod 36 is moved to bring the discs 30 into contact with the striker fork stems 29, and the appropriate clutches are thus actuated to produce a desired speed, the discs 30 will spring apart on release of the rod 36, as shown in Figure 3, and it will be understood, therefore, that the clutches should be of a well-known form which will remain "in" until positively released. Furthermore, the clutches, which are preferably of the multi-disc type, should be adapted for taking up smoothly the large loads which would be encountered when changing, for example, from top to bottom speed.

When the striker fork stems 29 are released in this way the recesses on the discs 30 are quite clear of them, and the discs can thus be rotated for a difftrent group of recesses to be brought into operative position, this rotation being effected, for example, by means of worm gearing 40 from a setting dial 41 mounted on a convenient part of the lathe and directly connected thereto or through a gear train 42 as shown. The spring-pressed plunger 43 co-operates with the eight notches in the star wheel 44 to assist in locating the discs against turning once they have been set by the dial 41.

The description above has referred to an eight-speed mechanism as it is probable that the invention will have its greatest utility in connection therewith. It will be evident, from a consideration of the above, that four speeds can be obtained by the omission of the third parallel lay-shaft 21 and its associated striking fork. In this case there would only be two recesses in each group, and there would be four groups on the discs corresponding to the four speeds.

In a similar manner, the addition of a further parallel lay-shaft and similar apparatus will allow of the use of sixteen speeds, of which any one could be brought into operation, after the control dial 41 had been previously set, instantaneously on the operation of the sliding rod 36.

The gearing as thus described is of a known form, and the present invention is concerned with the actuation of the sliding rod 36. It is assumed that when the mechanism has been preselected a change of speed will be effected by sliding the rod 36 to the left (Figure 8).

In the present instance the rod 36 has a gash 52 in it engaged by one arm of a bell-crank lever 53 which is fast on a shaft 54, the other arm thereof carrying a roller 55 which coacts with a cam 56. The cam is fast on a slidable portion 58 of a dog clutch, the slidable portion being biassed by a spring 59 into engagement with a coacting clutch portion 61. The cam 56 is of sufficient width, as shown by Figure 7, to remain in contact with the roller in the extreme positions of the slidable clutch portion 58. The coacting clutch portion 61 is continuously driven, being fast with a worm wheel 62 driven through a worm 63 on the rotor shaft of an electric motor, indicated at 64. At the upper end of the rotor shaft is disposed a fly-wheel 65, whilst the upper extremity 66 of the shaft is made non-circular beneath a detachable cover 67.

The clutch is normally held out of engagement by means of a pin 71 engaged in a cam groove 72 of the slidable clutch portion 58. The pin 71 is carried by an arm 74 which is loosely journalled on the shaft 54 and has a pin-and-slot connection at 75 with a spring-pressed push-button control 76.

With the parts in the position shown, and assuming the electric motor to be energized, pressure on the push-button 76 rocks the arm 74, thereby raising the pin 71 clear of the cam groove 72 and allowing the clutch to engage under the pressure of the spring 59. Thereupon the slidable clutch portion 58 is rotated and the cam 56, acting on the bell-crank lever 53, rocks it clockwise (Figure 8) and thereby gives a sudden impulse to the slidable rod 36 which is sufficient to actuate the change-speed mechanism and introduce the pre-selected ratio. Meanwhile the portion 77 of the cam groove 72 will have become aligned with the pin 71, which can again drop into the cam groove. Consequently, on the further rotation of the slidable clutch portion the other side of the cam groove, on riding up the pin, draws back the slidable clutch portion out of engagement with the continuously-driven portion 61. When the cam 56 has turned to bring its low part into engagement with the roller 55 (as shown in Figure 8) the slidable rod 36 is returned by the applied spring pressure 39 and the parts are ready for a subsequent operation.

Whilst I show a push-button control 76, in practice this member may, if desired, be actuated by a cam drum or equivalent part of a machine-tool as will be well understood.

If the pre-selective mechanism should have been incorrectly set in the first instance, or if for some other reason a change of ratio cannot be effected, the parts will jam and the motor will stall. After the current has been switched off the cover 67 can be removed and, by means of an appropriate tool placed on the non-circular end 66, the rotor shaft and the reduction gearing can be unwound to release the jammed parts.

As previously stated, a light-powered motor, of about one-sixth or one-eighth H. P. adapted to operate at, say, 3000 R. P. M. and to drive the worm wheel at about, say, 100 R. P. M., will be satisfactory, and the fly-wheel size is chosen to give sufficient impetus to the parts in moving the sliding rod 36 but insufficient impetus to cause fracture in the event of there being any obstruction.

What I claim as my invention and desire to secure by Letters Patent of the United States is:

1. The combination with a preselective change-speed gearing, of a rod for actuating said gearing, a low-power electric motor, a relatively-heavy flywheel driven by the rotor of said motor, a controllable clutch, a reduction gear interconnecting the driving part of said clutch and said rotor, and means interconnecting the driven part of said clutch and said rod whereby the latter will be actuated when said clutch is engaged during a partial rotation thereof.

2. The combination with a preselective change-speed gearing, of a rod for actuating said gearing, a low-power electric motor, a relatively-heavy flywheel driven by the rotor of said motor, a controllable clutch, a reduction gear interconnecting the driving part of said clutch and said rotor, and means interconnecting the driven part of said clutch and said rod whereby the latter will be actuated when said clutch is engaged during a partial rotation thereof, said motor being of about one-sixth to one-eighth horse power and operating at about 3000 R. P. M.

3. The combination with a preselective change-speed gearing, of a rod for actuating said gearing, a low-power electric motor, a relatively-heavy flywheel driven by the rotor of said motor, a controllable clutch, a reduction gear interconnecting the driving part of said clutch and said rotor, and means interconnecting the driven part of said clutch and said rod whereby the latter will be actuated when said clutch is engaged during a partial rotation thereof, said motor having a non-circular shaft end which can be manually reversed if the parts should jam.

4. The combination with a preselective change-speed gearing, of a rod slidable in one direction for actuating said gearing, a low-power electric motor, a relatively-heavy flywheel driven by the rotor of said motor, a controllable dog clutch, a worm reduction gear interconnecting the driving part of said clutch and said rotor, and means interconnecting the driven part of said clutch and said rod whereby the latter will be actuated in the said one direction when said clutch is engaged during a partial rotation thereof.

5. The combination with a preselective change-speed gearing, of a rod for actuating said gearing, a lower-power electric motor, a relatively-heavy flywheel driven by the rotor of said motor, a controllable clutch, a reduction gear interconnecting the driving part of said clutch and said rotor, and means interconnecting the driven part of said clutch and said rod whereby the latter will be actuated when said clutch is engaged during a partial rotation thereof, said means including a cam fast with said driven part, and a lever engaged with said rod and coacting with said cam.

6. In combination, a preselective change-speed gearing having shiftable elements, striking forks by which said elements can be shifted, said striking forks having grouped stems, profile members on opposite sides of said stems, said profile members being rotatable to bring different complementary parts thereof into co-acting association with said stems, means including a slidable rod for contracting said profile members on to said stems whereby to shift said striking forks dependently upon the setting of said profile members and thereby introduce a preselected ratio, a lever for sliding said rod, a cam for operating said lever, power-driving means, and a clutch for driving said cam from said power-driving means.

7. In combination, a preselective change-speed gearing having shiftable elements, striking forks by which said elements can be shifted, said striking forks having grouped stems, profile members on opposite sides of said stems, said profile members being rotatable to bring different complementary parts thereof into co-acting association with said stems, means including a slidable rod for contracting said profile members on to said stems whereby to shift said striking forks dependently upon the setting of said profile members and thereby introduce a preselected ratio, a lever for sliding said rod, a cam for operating said lever, electric power-driving means, a dog clutch for driving said cam from said power-driving means, spring means biassing said clutch in engaging direction, and control means holding said clutch disengaged.

8. In combination, a preselective change-speed gearing having shiftable elements by which the different ratios can be introduced, striking forks by which said elements can be shifted, said striking forks having stems grouped beside one another, profile members on opposite sides of said stems, said profile members being rotatable to bring different complementary parts thereof into co-acting association with said stems, means including a slidable rod for contracting said profile members on to said stems whereby to shift said striking forks dependently upon the setting of said profile members and thereby introduce a preselected ratio, a lever for sliding said rod, a cam for operating said lever, a dog clutch having a driving part and a slidable driven part, said cam being fast on said driven part, spring means biassing said driven clutch part in engaging direction, control means withholding said driven part from engagement, a continuously operating electric motor, a flywheel driven by the rotor of said motor, and reduction gearing interconnecting said rotor and driving clutch part.

ARTHUR H. LLOYD.